United States Patent [19]

Schreiber et al.

[11] 4,165,286
[45] Aug. 21, 1979

[54] APPARATUS FOR THE INTERMITTENT AERATION OF SEWAGE

[75] Inventors: August Schreiber, Rahnofstrasse 45, 3001 Hannover-Vinnhorst, Fed. Rep. of Germany; Siegfried Rudolph, Hannover, Fed. Rep. of Germany

[73] Assignee: August Schreiber, Hannover-Vinnhorst, Fed. Rep. of Germany

[21] Appl. No.: 869,760

[22] Filed: Jan. 16, 1978

[30] Foreign Application Priority Data

Jan. 17, 1977 [DE] Fed. Rep. of Germany ....... 2701656

[51] Int. Cl.² .............................. C02C 1/12; B01F 3/04
[52] U.S. Cl. ..................... 210/220; 261/122; 239/533.13; 239/547; 239/570
[58] Field of Search .............. 210/15, 199, 220, 63 R, 210/221 R, 221 P; 261/122, 124; 239/435, 533.13, 546, 547, 548, 570

[56] References Cited

U.S. PATENT DOCUMENTS

| 1,810,394 | 6/1931 | Dyhr | 261/122 |
| 3,279,773 | 10/1966 | Schwartz | 261/122 |
| 3,293,861 | 12/1966 | Hinde | 210/15 |
| 3,525,685 | 8/1970 | Edwards | 261/124 |
| 3,545,731 | 12/1970 | McManus | 261/122 |
| 3,642,260 | 2/1972 | Danjes | 261/122 |
| 3,777,987 | 12/1973 | Allport | 239/547 |
| 4,060,486 | 11/1977 | Schreiber | 210/220 |

FOREIGN PATENT DOCUMENTS

| 529819 | 2/1977 | Bulgaria | 239/547 |
| 2161636 | 6/1973 | Fed. Rep. of Germany | 239/547 |
| 1535624 | 6/1967 | France | 239/547 |

Primary Examiner—Charles N. Hart
Assistant Examiner—Ernest G. Therkorn
Attorney, Agent, or Firm—Watson, Cole, Grindle & Watson

[57] ABSTRACT

Disclosed is an apparatus for the intermittent aeration of sewage or sewage-activated sludge mixtures. The apparatus is adapted to be disposed below water level and consists of a horizontal air distributor in the form of a pipe jacket closed tightly at both ends except for an aperture for the air supply, and which, in the area of its two opposite lateral longitudinal edges, includes apertures for the passage of air. The apparatus further includes an elastic air distributing foil covering the apertures for the passage of air and the upper portion of the pipe jacket located between the apertures. The foil is provided with air escape openings which are opened by the air supply to the pipe jacket and closed in case of interruption of the air supply by being sealed against the pipe jacket outside the area of the air passage openings. The apparatus further includes distancing strips located at the two opposite lateral longitudinal edges of the pipe jacket, below the openings for the passage of air and between the pipe jacket and the air distributor foil.

11 Claims, 4 Drawing Figures

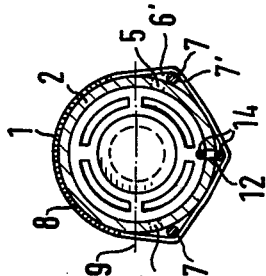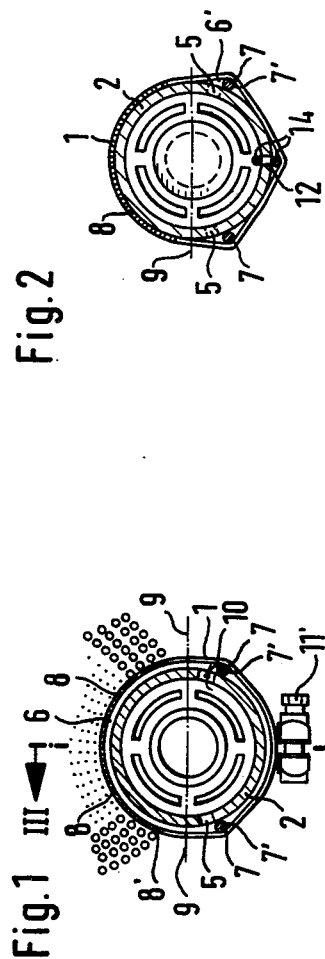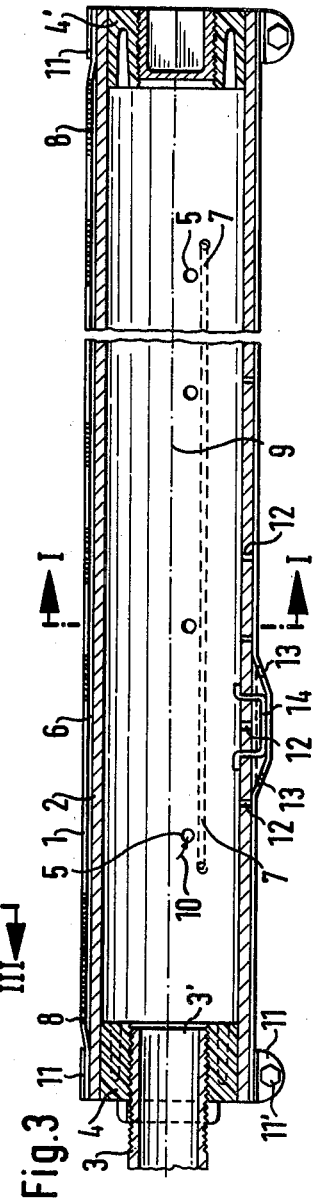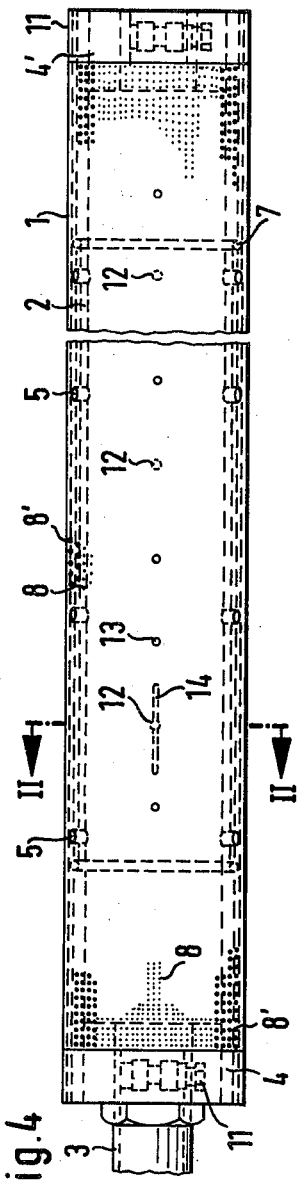

APPARATUS FOR THE INTERMITTENT AERATION OF SEWAGE

BACKGROUND OF THE INVENTION

The present invention relates to an apparatus for the intermittent aeration of sewage and is more particularly concerned with an apparatus adapted to be disposed below water level which consists of a horizontal air distributor in the form of a pipe jacket closed tightly at both ends except for an aperture for the air supply, and which, in the area of its two opposite lateral longitudinal edges includes apertures for the passage of air. The apparatus further includes an elastic air ditributing foil covering the apertures for the passage of air and the upper portion of the pipe jacket located between the apertures. The foil is provided with fine air escape openings which are opened by the air supply to the pipe jacket and closed in case of interruption of the air supply by being sealed against the pipe jacket outside the area of the air passage openings.

U.S. Pat. No. 4,060,486 to Schreiber discloses an air distributor apparatus having an oval cross section together with an air distributor foil, the oval cross section being formed by the pipe jacket having in its upper area a lesser curvature and in its lower area a greater curvature. The openings for the passage of air in the two lateral longitudinal edges of the pipe jacket are disposed in the upper less arched part of the pipe jacket. Furthmore, a raised shape is provided on both sides of the top portion of the pipe jacket which projects upward over the elliptically arched shape of the pipe jacket. Immediately beside each shape and between the raised shapes and the curvature of the upper area, there is an indentation with openings for the passage of air which extend nearly over the entire length of the pipe jacket, over which stretches the air distributor foil having pricked air exit openings. The air distributor foil is thus supported by the two projecting raised shapes and by the curvature of the upper area of the pipe jacket, the two indentations having the openings for the passage of air not being covered by the foil.

As a result, a free lateral space is developed in the area of the two indentations for the unimpeded entry of air through the openings for the passage of air which does not eliminate the hydrostatic pressure acting on the air distributor submerged in the sewage since the air distributor foil is not pressed air-tight into the indentation and onto the openings for the passage of air. Even in the case of the slightest excess pressure, about 30 cm water-column pressure as compared to the water pressure of the submerged air distributor, compressed air will enter into the two lateral spaces created by the indentations, be distributed over the entire length of the air distributor and without any increased air resistance, lift the air distributor foil from the curvature of the upper area of the pipe jacket. As a result, an interval connecting the two lateral spaces and extending over the upper area of the pipe jacket develops between the jacket and the air distributor foil and the air thereby escapes through the openings of the air distributor foil into the sewage or the sewage-activated sludge mixture with about 40 cm water-column pressure.

The consequence of this operation of the known apparatus is that the compressed air is distributed uniformly in the above mentioned interval and escapes into the sewage or sewage activated-sludge mixture surrounding the air distributor as aeration air in a uniform distribution through the air escape openings of the air distributor foil. Upon completion or interruption of the air supply to the pipe jacket, the elastic air distributor foil, as a consequence of the then prevailing excess pressure of the surrounding sewage, fits against the curvature of the upper area of the pipe jacket so that the escape of air through the finely-pricked air-escape openings of the air distributor foil is stopped and any trickling in of the sludge particles is thereby avoided.

However, the manufacture of the pipe jacket described above having less of a curvature in the upper area and a greater curvature in the lower area is expensive from the view of production engineering. Additionally, the sealing at the ends of the pipe jacket becomes difficult due to the irregular oval cross section of the pipe jacket and of the closing lid adapted to fit about the jacket.

SUMMARY OF THE INVENTION

The present invention is based on the task of creating an apparatus of the initially mentioned type where a simpler development of the air distributor foil is possible, while still maintaining the manner of the escape of the ventilation air from the interval forming during the action of the compressed air lifting off of the air distributor foil as in the case of the known apparatus for the uniform distribution of air.

In order to solve this task, the proposal is made according to the present invention that a distancing strip is provided in the apparatus at the two opposite lateral longitudinal edges of the pipe jacket, below the openings for the passage of air and between the pipe jacket and the air distributor foil. This distancing strip, together with the section of the air distributor foil extending from the pipe jacket to the distancing strip and the section of the pipe jacket not covered by the air distributor foil, delimit a space in which the air may enter with little resistance and be distributed over its length, the air then lifting off the air distributor foil and escaping into the sewage activated sludge mixture about the apparatus. In case of interruption of the air supply to the apparatus, closure of the air escape openings of the distributor foil is accomplished.

As a result of the use of distancing strips, the escape of the aeration air in an even distribution from the interval between pipe jacket and air distributor foil developed due to the action by compressed air lifting off the air distributor foil and forming in the upper area of the pipe jacket between the distancing strip is assured.

The bending resistance of the air distributor formed by the pipe jacket may be achieved or improved effectively due to the fact that the pipe jacket has a normal or regular cross section, especially a circular cross section. As a result, production expenses are reduced even further. As a result of using distancing strips disposed at both sides of the pipe jacket which has a circular cross section, the essentially oval cross section of the air distributor favorable for the lifting off of the air distributor foil and the escape of the aeration air in uniform distribution will be achieved. In addition, as a result of the bending resistant nature of the pipe jacket, expenditures for a special bracing bar becomes superfluous.

Preferably, the distancing strips will have an elastic coating for the protection of the air distributor foil consisting of elastic working material, for example, of fine plastic tissue, and which on the side resting on the pipe jacket is coated with elastic plastic. The distancing strips themselves may be formed by a wire. It will be advantageous for the formation of a relatively large interval between pipe jacket and air distributor foil if the openings for the passage of air in the pipe jacket are disposed somewhat below the horizontal center plane of the pipe jacket. As a result, one will achieve, as compared to the known apparatus, an interval extending over a larger part of the pipe jacket and thus an intensification of the escape of the ventilation air in a regular distribution into the surrounding sewage.

The bending resistance of the pipe jacket is increased even further whenever a closing lid of rigid material, for example, steel or plastic is used as an air-tight closure for the pipe jacket at its two ends. The air distributor foil located about the pipe jacket may be clamped down air-tight against the pipe jacket by clip-like clamping rings disposed in the area of the closing lids. At the same time a self-supporting construction will result, especially whenever at least one of the closing lids is provided with an air supply opening into which an air supply line may be inserted. Preferably, the air supply line is screwed together with threads in the air supply opening and is connected at its other end with an air distributor line.

The air distributor foil effectively encloses the pipe jacket over its entire periphery. The air escape openings of the air distributor foil, preferably pricked with a needle from the inside to the outside, are disposed in the upper area between the distancing strips and at a distance from the air passage openings of the pipe jacket. When compressed air is supplied in the pipe jacket and the interval between the pipe jacket and air distributor is caused to form above the upper area of the pipe jacket between the lateral distancing strips, the air distributor foil is thus pulled with great tension against the lower area of the pipe jacket between the distancing strips. Thus, no sludge particles from the surrounding sewage-activated sludge mixture can collect between pipe jacket and air distributor foil.

However, in order to be able to remove any sludge particles that nevertheless reach this area against all expectations, the area of the lower longitudinal side of the pipe jacket may be provided with a few additional air passage openings and additional air escape openings may be provided in a corresponding portion of the air distributor foil.

According to the previously mentioned embodiment, when air is supplied to the pipe jacket, the sludge particles which have collected between the lower area of the pipe jacket and the air distributor foil may easily be blown out again into the surrounding sewage-activated-sludge mixture. This effect may be facilitated even more by including at least one distancing strip adjacent to the air passage openings and to the air escape openings and between the pipe jacket and the air distributor foil. These distancing strips may consist of a thinner wire, etc., as compared to the above-mentioned distancing strips.

The apparatus will be more effective whenever that portion of the air escape openings of the foil closest to the distancing strips of all the air escape openings of the air distributor foil disposed above the two opposite distancing strips have a larger cross section than the remainder of these air escape openings.

DESCRIPTION OF THE DRAWING

The drawing shows embodiments of the invention by way of example.

FIG. 1 shows an air distributor in the form of a pipe jacket with circular cross section having air supply into the inside of the pipe jacket, the distributor in section according to line I—I of FIG. 3;

FIG. 2 shows the air distributor of FIG. 1, with attached air supply in section following line II—II of FIG. 4;

FIG. 3 shows the air distributor in vertical longitudinal section following line III—III in FIG. 1; and FIG. 4 shows the air distributor with attached air supply in a view from above.

DETAILED DESCRIPTION OF THE PREFERRED EMBODIMENT

The apparatus shown in FIGS. 1 through 4 consists of a horizontal air distributor disposed below water level and in the form of a pipe jacket 2 having a circular cross section. According to FIGS. 1 and 2, the pipe jacket is surrounded by a hose-shaped air distributor foil 1 made of elastic material. The pipe jacket 2 consists of a bend resistant material and below its horizontal middle plane 9 is provided with air passage openings 5 in the area of its horizontal opposite, lateral longitudinal edges. The air distributor foil 1, in the upper area of the pipe jacket 2 and between the air passage openings 5 and at a distance from the air passage openings 5, has air escape openings 8, effectively pricked from the inside to the outside. A distancing strip 7, for example, a wire provided with an elastic coating 8 (FIG. 1), is disposed below the air passage openings 5 in the area of the two opposite pipe jacket longitudinal areas and between the pipe jacket 2 and the air distributor foil 1.

Closing lids 4 and 4', made of rigid material are inserted in both ends of pipe jacket 2 to provide an airtight closure for the jacket. The air distributor foil 1 is clamped fixedly against the pipe jacket 2 in an airtight manner by clamp-like locking rings 11 having a tightening screw 11' disposed in the area of the respective closing lids 4 and 4', in order to seal the air distributor foil 1 against the pipe jacket 2. The left hand closing lid 4 shown in FIGS. 1, 3 and 4 has an air intake aperture 3' provided with an internal thread which is screwed together with an air supply line 3 carrying the entire air distributor formed by the pipe jacket 2. The air supply line 3 is connected with an air distributor line (not shown) with which still other similar air supply lines carrying air distributors formed by one pipe jacket may be connected.

When air is supplied to the pipe jacket 2, the air flows without resistance in the direction 10 of the air flow and through the air passage openings 5 into the two spaces 6' which extend over the entire length of the distance strips 7. These spaces, as is shown in FIG. 2, are located above the distancing strips 7 in the area of the air passage openings 5, and are bounded by the portion of the air distributor foil 1 extending from the pipe jacket 2 to the distancing foil 7, by the distancing strip 7 and by the portion of the pipe jacket 2 not covered by the air distributor foil 1. The air is distributed promptly in the spaces 6' over the entire length below the air distributor foil 1 and above the distancing strips 7 and thereby lifts the air distributor foil 1 from contact with the pipe jacket 2. Thus all air escape openings 8 of the air distributor foil 1 are lying open for the escape of compressed air into the sewage activated-sludge mixture about the apparatus. The spaces 6' are always open for flow of compressed air, even in case of high outside water pressure, since the air distributor foil 1 will not be pressed into the spaces 6' sufficiently far that entry of air through the air passage openings 5 will be prevented.

A narrow interval 6, which in cross section has the shape of a portion of a circular ring, is formed by air pressure between the pipe jacket 2 and air distributor foil 1. In this interval 6, the compressed air is distributed uniformly and the compressed air, in this uniform distribution, reaches the surrounding sewage or sewage activated-sludge mixture as aeration or activating air by passing through the air escape openings 8 of the air distributor foil 1.

The area of the lower longitudinal side of the pipe jacket 2 has several additional air passage openings 12, and the air distributor foil 1 is provided with additional air escape openings 13 in the lower area located between the two distancing strips 7. These additional air escape openings 13 are disposed outside the area of the additional air passage openings 12 of the pipe jacket 2 and are therefore displaced in relation to the latter. Lower distancing strips 14 adjacent to the air escape openings 13 are provided between the pipe jacket 2 and the air distributor foil 1.

As is shown in FIGS. 1 and 4, of the air escape openings 8 disposed above the two opposite distancing strips 7, those air escape openings 8' which lie nearest to the above-mentioned distancing strips 7 have a larger cross section or diameter than the remaining air escape openings 8. In this way, a series of air escape openings 8' results immediately above the air passage openings 5 of the pipe jacket in the air distributor foil 1, the diameter or cross section of which is larger than the remaining air escape openings 8 located on the top area of the distributor foil.

While there has been shown and described what is considered to be a preferred embodiment of the present invention, it will be evident to those skilled in the art that various changes and modifications may be made therein without departing from the invention as defined in the appended claims.

We claim:

1. An apparatus for the intermittent aeration of sewage comprising a horizontal air distributor in the form of a pipe jacket of bend resistant material having a generally circular cross section, being closed on both ends except for an opening in the supply of air, and having air passage openings in the area in its two opposite lateral longitudinal edges below the horizontal middle plane of the pipe jacket, an elastic air distributor foil covering the air passage openings and the area of the pipe jacket located between the openings, the foil provided with air escape openings which are opened by a supply of air to the pipe jacket and closed upon interruption of the air supply and which is sealed against the pipe jacket outside the area of the air escape openings, and a distancing strip disposed along each of the two opposite lateral longitudinal edges of the pipe jacket, below the air passage openings and between the pipe jacket and the air distributor foil such that each distancing strip together with the section of the air distributor foil extending from the pipe jacket to the distancing strip and with the section of the pipe jacket not covered by the air distributor foil form a space whereby air may enter with little resistance and be distributed the length of the distancing strip and lift the air distributor foil so as to permit air to escape into sewage and whereby upon termination of air supply, the air escape openings of the air distributor foil are closed.

2. An apparatus according to claim 1, wherein the distancing strips have an elastic coating.

3. An apparatus according to claim 1, wherein the distancing strips are formed by a wire.

4. An apparatus according to claim 1, wherein the air escape openings of the air distributor foil are disposed outside the area of the air passage openings of the pipe jacket.

5. An apparatus according to claim 1, wherein a cover lid of rigid material is used as an airtight closure for the ends of the pipe jacket and the air distributor foil is clamped down firmly and airtightly against the pipe jacket by clamplike tension rings located in the area of the cover lids.

6. An apparatus according to claim 5, wherein at least one of the cover lids is provided with an air supply opening into which an air supply line projects.

7. An apparatus according to claim 1, wherein the air distributor foil surrounds the entire outer periphery of the pipe jacket.

8. An apparatus according to claim 7, wherein additional air passage openings are provided in the area of the lower longitudinal side of the pipe jacket and the air distributor foil includes additional air escape openings in its lower area between the two distancing strips.

9. An apparatus according to claim 8, wherein the additional air escape openings of the air distributor foil are disposed outside the area of the additional air passage openings of the pipe jacket.

10. An apparatus according to claim 8, wherein at least one additional distancing strip is provided between the pipe jacket and the air distributor foil and adjacent to the additional air passage openings and the air escape openings.

11. An apparatus according to claim 1, wherein the air escape openings disposed above the two opposite distancing strips and nearest the distancing strips have a large cross section than the remainder of the air escape openings above the distancing strips.

* * * * *